United States Patent
Zhang et al.

(10) Patent No.: US 9,217,816 B2
(45) Date of Patent: Dec. 22, 2015

(54) RETROREFLECTIVE ARTICLES AND APPLIQUES

(71) Applicant: 3M INNOVATIVE PROPERTIES COMPANY, St. Paul, MN (US)

(72) Inventors: Xiwen Zhang, Shanghai (CN); Ningyong Huang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 126 days.

(21) Appl. No.: 14/059,810

(22) Filed: Oct. 22, 2013

(65) Prior Publication Data

US 2014/0247491 A1    Sep. 4, 2014

(30) Foreign Application Priority Data

Oct. 26, 2012  (CN) .......................... 2012 1 0417901

(51) Int. Cl.
 *G02B 5/12*     (2006.01)
 *G02B 5/128*    (2006.01)
 *G02B 5/136*    (2006.01)
 *A41D 13/01*    (2006.01)
 *A41D 31/00*    (2006.01)

(52) U.S. Cl.
 CPC ................ *G02B 5/128* (2013.01); *A41D 13/01* (2013.01); *A41D 31/0094* (2013.01); *G02B 5/136* (2013.01)

(58) Field of Classification Search
 CPC .................. G02B 5/12–5/136; Y10T 428/252; Y10T 428/24372; C09D 5/004; E01F 9/041
 USPC ........... 359/515–553; 428/323–331; 523/172, 523/219, 223
 See application file for complete search history.

(56) References Cited

U.S. PATENT DOCUMENTS

| | | | |
|---|---|---|---|
| 1,175,224 A | 3/1916 | Bleecker |
| 2,461,011 A | 8/1945 | Taylor |
| 2,726,161 A | 12/1955 | Beck |
| 2,965,921 A | 8/1957 | Bland |
| 2,842,446 A | 7/1958 | Beck |
| 2,853,393 A | 9/1958 | Beck |
| 2,870,030 A | 1/1959 | Stradley |
| 2,992,122 A | 2/1959 | Beck |
| 2,939,797 A | 6/1960 | Rindone |
| 3,468,681 A | 9/1969 | Jaupain |
| 3,700,305 A | 10/1972 | Bingham |
| 3,946,130 A | 3/1976 | Tung |
| 4,025,159 A | 5/1977 | McGrath |

(Continued)

FOREIGN PATENT DOCUMENTS

| | | |
|---|---|---|
| EP | 1273934 | 1/2003 |
| EP | 1584738 | 10/2005 |

*Primary Examiner* — Darryl J Collins
*Assistant Examiner* — Kristina Deherrera
(74) *Attorney, Agent, or Firm* — Jeffrey M. Olofson

(57) ABSTRACT

Retroreflective articles and appliqués include a first binder layer with a first major surface and a second major surface, a retroreflective layer including a plurality of retroreflective elements at least partially embedded in the first major surface of the first binder layer, a second binder layer adhered to the second major surface of the first binder layer, and a substrate layer attached to the second binder layer. The first binder layer is a non-thermoplastic crosslinked (meth)acrylate-based copolymer. The second binder layer is a moisture-cured urethane-based polymer. The first binder layer and the second binder layer include functional groups capable of co-reacting to form a chemical bond. The retroreflective appliqués can be attached to clothing articles.

15 Claims, 1 Drawing Sheet

(56) References Cited

U.S. PATENT DOCUMENTS

| | | | |
|---|---|---|---|
| 4,038,454 A * | 7/1977 | Lehmann et al. | 428/356 |
| 4,192,576 A | 3/1980 | Tung | |
| 4,367,919 A | 1/1983 | Tung | |
| 4,564,556 A | 1/1986 | Lange | |
| 4,637,950 A | 1/1987 | Bergeson | |
| 4,758,469 A | 7/1988 | Lange | |
| 4,763,985 A | 8/1988 | Bingham | |
| 4,772,511 A | 9/1988 | Wood | |
| 4,931,414 A | 6/1990 | Wood | |
| 5,200,262 A | 4/1993 | Li | |
| 5,283,101 A | 2/1994 | Li | |
| 5,338,595 A | 8/1994 | Li | |
| 5,474,827 A | 12/1995 | Crandall | |
| 5,601,911 A | 2/1997 | Ochi | |
| 5,620,775 A * | 4/1997 | LaPerre | 428/149 |
| 5,645,938 A | 7/1997 | Crandall | |
| 5,650,213 A | 7/1997 | Rizika | |
| 5,910,858 A | 6/1999 | Frey | |
| 5,976,669 A | 11/1999 | Fleming | |
| 6,059,915 A | 5/2000 | Lightle | |
| 6,110,558 A | 8/2000 | Billingsley | |
| 6,153,128 A * | 11/2000 | Lightle et al. | 264/1.9 |
| 6,361,850 B1 | 3/2002 | Billingsley | |
| 6,416,856 B1 * | 7/2002 | Crandall | 428/325 |
| 1,402,170 A1 | 3/2006 | Sleeman | |
| 1,468,619 A1 | 10/2006 | Bartoli | |
| 7,385,020 B2 | 6/2008 | Anderson | |
| 7,695,147 B2 | 4/2010 | Lee | |
| 7,906,193 B2 | 3/2011 | Yukawa | |
| 8,030,395 B2 | 10/2011 | Tseng | |
| 2002/0076390 A1 | 6/2002 | Kantner | |
| 2011/0034624 A1 | 2/2011 | Ma | |
| 2014/0118827 A1 | 5/2014 | Zhang | |

* cited by examiner

RETROREFLECTIVE ARTICLES AND APPLIQUES

RELATED APPLICATION—FOREIGN PRIORITY

This application claims priority from Chinese Patent Application Serial No. 201210417901.1, filed Oct. 26, 2012.

FIELD OF THE DISCLOSURE

This disclosure relates to retroreflective articles, retroreflective appliqués, and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric binder layer, a reflective layer, and may also have a substrate layer. The optical lens elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a binder layer over the coated microspheres. Often a pressure sensitive adhesive is applied on the binder layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

A variety of multiple layer retroreflecting articles have been described. For example, European Patent No. EP 1,273,934 (Corradi) describes multilayer articles with a plurality of glass microspheres, a first primer layer, a layer of reflective metal material, a second primer layer, a third primer layer and a layer of heat-adhesive strip underlying and coupling with the third primer layer. The primer layers may comprise polyurethanes. U.S. Pat. No. 5,620,775 (LaPerre) describes multilayer articles that include a first adhesive layer, a layer of a mixture of glass microspheres and irregularly shaped glass particles. The article can be bonded to a substrate by a substrate adhesive. U.S. Pat. No. 7,695,147 (Lee) describes a multilayer retroreflective article with a glass bead layer, an aluminum layer, a water based color resin layer, a water based adhesive resin coating layer, and a base layer. The water based color resin layer and the water based adhesive resin coating layer may be polyurethane resin layers. U.S. Pat. No. 6,059,915 (Lightle et al.) describes a retroreflective article with a supporting structure containing a non-filamentary layer of an acrylic polymer, a layer of optical lens elements in the supporting structure, and a reflective material disposed between the optical lens elements and the supporting structure. The supporting structure is capable of acting as a heat-activatable adhesive.

A number of multiple layer articles have been prepared that are described as retaining their retroreflectivity after multiple wash cycles. U.S. Pat. No. 6,361,850 (Billingsley et al.) describes a retroreflective article with a layer of optical elements partially embedded in a binder layer, a reflective layer disposed behind the optical elements, and a colored layer disposed between the reflective layer and the optical elements. U.S. Pat. No. 5,283,101 (Li) describes a retroreflective article with a layer of optical elements protruding from a binder layer, and an optional adhesive layer attached to the binder layer. The binder layer comprises an electron-beam curable polymer that is selected from chlorosulfonated polyethylenes, ethylene copolymers, and EPDM. U.S. Pat. No. 6,110,558 (Billingsley et al.) describes articles of clothing with retroreflective appliqués. The retroreflective appliqués include a retroreflective layer (optical elements with a metal reflective layer) and a binder layer. The binder layer may be a thermoplastic copolymer which contains carboxyl groups. U.S. Pat. No. 5,474,827 (Crandall et al.) describes a retroreflective articles that include a monolayer of retroreflective elements, a binder layer and a compound comprising an aromatic bidentate moiety. The retroreflective elements are partially embedded in the binder layer and the compound is chemically associated with the retroreflective elements.

SUMMARY

Disclosed herein are retroreflective articles, these articles include retroreflective appliqués, and clothing articles that have retroreflective appliqués attached to them. Also disclosed herein are methods of preparing retroreflective articles, including methods for preparing retroreflective appliqués and methods for preparing retroreflective clothing articles containing retroreflective appliqués.

In some embodiments, the retroreflective article and/or appliqué comprises, a first binder layer with a first major surface and a second major surface, a retroreflective layer comprising a plurality of retroreflective elements at least partially embedded in the first major surface of the first binder layer, a second binder layer adhered to the second major surface of the first binder layer, and a substrate layer attached to the second binder layer. The first binder layer comprises a non-thermoplastic crosslinked (meth)acrylate-based copolymer. The second binder layer comprises a moisture-cured urethane-based polymer. The first binder layer and the second binder layer comprise functional groups capable of co-reacting to form a chemical bond.

Also disclosed are retroreflective articles of clothing. These articles of clothing comprise a substrate surface which forms part of the outer portion of an article of clothing, and a retroreflective appliqué attached to the substrate surface. The retroreflective appliqués have been described above.

A variety of methods are also described, including methods of making retroreflective appliqués as well as methods of using these retroreflective appliqués to prepare retroreflective articles. In some embodiments, the method comprises preparing a retroreflective appliqué. This method comprises supporting a first portion of a layer of optical elements in a carrier web such that a second portion of the layer of optical elements protrudes from the carrier web, applying a coating of a reflective material on the second portion of the layer of optical elements, forming over the second portion of the optical elements a layer of a (meth)acrylate-based pressure sensitive adhesive, exposing the (meth)acrylate-based pressure sensitive adhesive to an elevated temperature of from 120° C. to 150° C. to form a non-thermoplastic crosslinked (meth)acrylate-based copolymer, forming a urethane-based moisture-curable layer on the non-thermoplastic crosslinked (meth)acrylate-based copolymer, exposing the urethane-based moisture-curable layer to an elevated temperature of from 60° C. to 90° C., laminating a substrate layer to the urethane-based moisture-curable layer, and permitting the urethane-based moisture-curable layer to cure by exposure to atmospheric moisture. In other embodiments, the method further comprises attaching the substrate layer of the retroreflective appliqué to a substrate surface of an article of clothing.

BRIEF DESCRIPTION OF THE DRAWINGS

The present application may be more completely understood in consideration of the following detailed description of various embodiments of the disclosure in connection with the accompanying drawings.

Figure 1:
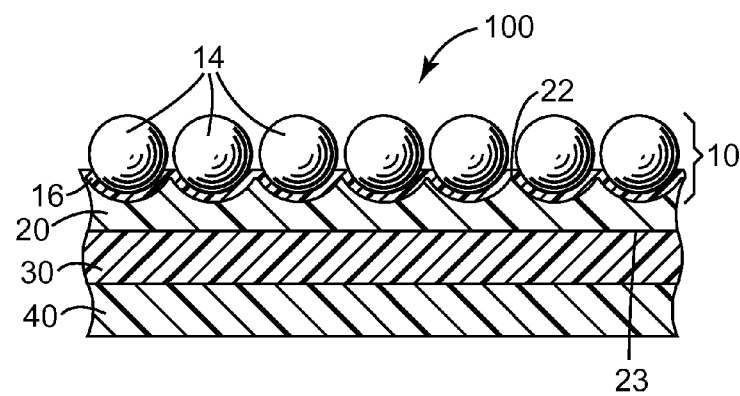
FIG. 1 shows a cross sectional view showing layers of a retroreflective article according to one embodiment of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective appliqués. Retroreflective appliqués typically have an optical element layer, a polymeric binder layer, and a reflective layer. The optical elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These appliqués can be attached to a wide range of articles, including everything from bicycles and motorized vehicles to a wide range of clothing such as jackets, vests, shirts, shoes, hats, and the like.

One difficulty with attaching retroreflective appliqués to clothing is the need to launder the clothing that contains the retroreflective appliqués. Laundering, especially the harsh industrial laundering required for clothing worn by fire fighters, construction workers and the like, can damage the retroreflective appliqués. This damage generally results from the microspheres being dislodged from the binder layer or from corrosion of the reflective layer. Therefore, an ongoing need remains for retroreflective articles and appliqués that can better withstand laundering without damage.

Disclosed herein are multi-layer retroreflective articles comprising a first binder layer with a first major surface and a second major surface and comprising a non-thermoplastic crosslinked (meth)acrylate-based copolymer, a retroreflective layer comprising a plurality of retroreflective elements at least partially embedded in the first major surface of the first binder layer, a second binder layer adhered to the second major surface of the first binder layer and comprising a moisture-cured urethane-based polymer, and a substrate layer attached to the second binder layer. The first binder layer and the second binder layer comprise functional groups capable of co-reacting to form a chemical bond. These multi-layer retroreflective articles may be used as appliqués by being attached to articles of clothing. Additionally, methods of preparing these articles of clothing are disclosed.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Unless otherwise indicated, the terms "transparent" and "optically transparent" are used interchangeably and refer to an article, film or adhesive that has a high light transmittance over at least a portion of the visible light spectrum (about 400 to about 700 nm).

The term "(meth)acrylate" refers to monomeric acrylic or methacrylic esters of alcohols. Acrylate and methacrylate monomers or oligomers are referred to collectively herein as "(meth)acrylates". The term "(meth)acrylate-based" when used to describe polymers, refers to polymers that are prepared from (meth)acrylate monomers. These polymers may contain only (meth)acrylate monomers or they contain monomers that are co-reactive with (meth)acrylates.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The terms "tackifying resin", "tackifying agent" and "tackifier" are used interchangeably herein.

The terms "plasticizing resin", "plasticizing agent" and "plasticizer" are used interchangeably herein.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

An embodiment of a multi-layer retroreflective article of this disclosure is shown in FIG. 1. FIG. 1 shows retroreflective layer 10, first binder layer 20, second binder layer 30 and substrate layer 40. Retroreflective layer 10 includes a plurality of retroreflective elements at least partially embedded in the first major surface 22 of the first binder layer 20. The retroreflective elements comprise optical elements 14 and reflective material 16. Optical elements 14 comprise microspheres. Second binder layer 30 is adhered to the second major surface 23 of the first binder layer 20. Substrate layer 40 is attached to the second binder layer 30. Each of these elements and layers will be described in greater detail below.

The multi-layer retroreflective articles comprise a retroreflective layer comprising a plurality of retroreflective elements at least partially embedded in the first major surface of the first binder layer. The retroreflective elements comprise optical elements 14 and reflective material 16. Optical elements 14 comprise microspheres.

The layer of microspheres 14 has a first portion that protrudes from the first binder layer 20 so as to be exposed to the ambient environment. In retroreflective appliqués, like the present disclosure, where the microspheres are exposed to the ambient environment (that is, they are not enclosed or encapsulated, by for example, a polymeric cover film) are referred to as "an exposed lens retroreflective appliqué." The layer of microspheres 14 has a second portion embedded in the first major surface 22 of the first binder layer 20. Reflective material 16 is located behind the embedded portion of the layer of microspheres and generally is disposed thereon.

The term "optical elements" means discrete elements capable of altering the direction of light so that a substantial quantity of incident light can be retroreflected. As indicated above, the optical elements used in retroreflective appliqués of this invention can be microspheres that, generally, are substantially spherical in shape in order to provide the most uniform and efficient retroreflection, and a reflective material. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used in this invention are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick. Although the reflective color of a silver coating can be brighter than an aluminum coating, an aluminum layer normally is more preferred because it can provide better laundering durability when adhered to a glass optical element.

In lieu of, or in addition to, a reflective metal layer, a dielectric mirror may be employed as a reflective material. The dielectric mirror may be similar to known dielectric mirrors disclosed in U.S. Pat. Nos. 3,700,305 and 4,763,985 to Bingham. When using a dielectric mirror, the optical elements typically have a refractive index $n_2$ and have a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2 O_5$, Te, $TiO_2$; low index materials such as $Al_2O_3$, $AlF_3$, $CaF_2$, $CeF_3$, LiF, $MgF_2$, $Na_3A^1F_6$, $ThOF_2$, elastomeric copolymers of perfluoropropylene and vinylidene fluoride (refractive index of $>>1.38$), et cetera. Other materials are reported in Thin Film Phenomena, K. L. Chopra, page 750, McGraw-Hill Book Company, N.Y., (1969). A particularly suitable dielectric mirror contains succeeding layers of cryolite ($Na_3AlF_6$) and zinc sulfide.

The multi-layer retroreflective articles also comprise a first binder layer 20 with a first major surface 22 and a second major surface 23 and comprising a non-thermoplastic crosslinked (meth)acrylate-based copolymer. The non-thermoplastic crosslinked (meth)acrylate-based copolymer is prepared by crosslinking a (meth)acrylate-based pressure sensitive adhesive.

A wide range of (meth)acrylate-based pressure sensitive adhesives are suitable as precursors to the non-thermoplastic crosslinked (meth)acrylate-based copolymer. It is desirable that the precursor (meth)acrylate-based copolymer have pressure sensitive properties when applied to achieve good adhesion to the retroreflective layer and then be subsequently crosslinked to form the non-thermoplastic crosslinked (meth) acrylate-based copolymer layer. A related method of applying uncrosslinked components and then crosslinking has been described in the co-pending application Attorney Docket No. 71033CN002 titled "RETROREFLECTIVE APPLIQUES AND ARTICLES" filed on the same day as the present application, where a co-polymer that is not a pressure sensitive adhesive but has a Tg of less than 30° C. is applied and crosslinked to form a non-thermoplastic crosslinked binder layer.

To achieve pressure sensitive adhesive characteristics, the corresponding precursor copolymer can be tailored to have a resultant glass transition temperature (Tg) of less than about 20° C., often less than about 0° C. Such copolymers typically are derived from monomers comprising 30 to 99.5% by weight of at least one alkyl (meth)acrylate monomer that, as a homopolymer, has a Tg of less than about 0° C.

Examples of such alkyl (meth)acrylate monomers are those in which the alkyl groups have from 1 to about 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate. Optionally, one or more monoethylenically unsaturated co-monomers may be polymerized with the acrylate or methacrylate monomers such as vinyl acetate, styrene, and the like, may be utilized in conjunction with one or more of the low Tg alkyl (meth)acrylate monomers, provided that the Tg of the resultant (meth)acrylate copolymer is in the desired range of less than about 20° C., more typically less than about 0° C. Additionally, renewable (meth)acrylate monomers such as are described in U.S. Pat. No. 7,385,020 (Anderson et al.) are suitable.

In some embodiments, it may be desirable to include (meth)acrylate monomers that contain hydroxyl groups. These hydroxyl-functional monomers provide hydroxyl-functionality to the (meth)acrylate-based copolymer. Hydroxyl-functionality can be desirable in the (meth)acrylate-based copolymer because these groups can co-react with isocyanate-functional groups of the second binder layer, as will be described in greater detail below. A variety of (meth) acrylate monomers that contain hydroxyl groups are available, such as, for example, 2-hydroxyethyl acrylate.

The pressure sensitive adhesive matrix also comprises acidic co-monomers comprising about 0.5% to about 70% by weight. The acidic co-monomers are copolymerizable with the (meth)acrylate monomers. Examples of suitable acidic monomers include ethylenically unsaturated carboxylic acids, ethylenically unsaturated sulfonic acids, ethylenically unsaturated phosphonic acids and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, typically ethylenically unsaturated carboxylic acids are used.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not interfere with the properties of the pressure sensitive adhesive.

The (meth)acrylate-based pressure sensitive adhesive matrix is crosslinked to form the non-thermoplastic crosslinked (meth)acrylate-based copolymer layer. This crosslinking is achieved through the use of a copolymerizable crosslinking agent. The choice of crosslinking agent depends upon the nature of polymer or copolymer which one wishes to crosslink. The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, when used, the crosslinking agent is used in an amount of about 0.1 to about 60% by weight, based on the total amount of monomers, more typically from 0.3-50% by weight crosslinker is used.

Suitable crosslinking agents are those that contain functionality which are reactive with carboxylic acid groups on the (meth)acrylate pressure sensitive adhesive copolymer. Examples of such crosslinkers include multifunctional aziridine, isocyanate and epoxy compounds. Examples of aziridine-type crosslinkers include, for example 1,4-bis(ethyleneiminocarbonylamino)benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), referred to herein as "Bisamide" is particularly useful. Common polyfunctional isocyanate crosslinkers include, for example, trimethylolpropane toluene diisocyanate, tolylene diisocyanate, and hexamethylene diisocyanate. A wide range of epoxy-functional compounds are useful. Examples of particularly suitable epoxy compounds include maleic anhydride modified epoxy resins.

As was mentioned above, it is desirable that the non-thermoplastic crosslinked (meth)acrylate-based copolymer contain acid and/or hydroxyl groups. These groups can co-react with isocyanate groups of the second binder layer to improve inter-layer adhesion as will be described below.

The crosslinkable mixture that is disposed on the retroreflective layer comprises the (meth)acrylate-based pressure sensitive adhesive, and crosslinking agent and may also include a variety of optional additives, as long as these additives do not interfere with the crosslinking reaction or negatively impact the properties of the final crosslinked copolymer. The crosslinkable mixture may contain a catalyst. The catalyst can facilitate the crosslinking reaction. Examples of suitable catalysts include imidazoles, such as 2-methyl imidazole or 2-ethyl-4-methyl imidazole. Tackifying agents (sometimes called tackifiers) have been mentioned above. Plasticizing agents (plasticizers) are also often added to adhesive compositions. One particularly suitable additive is a coupling agent. Coupling agents are compounds with different terminal functional groups. This di-functionality permits these compounds to react or interact with two different environments and thereby provide a link between the environments. Examples of suitable coupling agents include the materials described as silane coupling agents.

Other optional additives include, fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

The multi-layer retroreflective articles also comprise a second binder layer 30 that is adhered to the second major surface 23 of the first binder layer 20. The second binder layer comprises a moisture-cured urethane-based polymer that is the reaction product of a mixture comprising an isocyanate-functional pre-polymer and atmospheric moisture. The isocyanate-functional prepolymer is the reaction product of at least one polyisocyanate and at least one polyol, where the ratio of polyisocyanate to polyol is greater than 1:1 and less than 8:1. The ratio is greater than 1:1 to ensure that the prepolymer is isocyanate-functional, that is to say that an excess of polyisocyanate is present to generate a prepolymer with terminal isocyanate groups.

The reaction to generate an isocyanate-functional prepolymer is shown in Reaction Scheme 1 shown below where polyol (HO—$R^1$—OH) reacts with excess polyisocyanate (OCN—$R^2$—NCO).

HO—$R^1$—OH+xsOCN—$R^2$—NCO→OCN—$R^2$—N(CO)[—O—$R^1$—O—(CO)N—$R^2$—N(CO)O—$R^1$—O—]$_n$(CO)N—$R^2$—NCO <span style="float:right">Reaction Scheme 1</span>

In Reaction Scheme 1:
$R^1$ is an alkylene, arylene, substituted alkylene or substituted arylene group;
$R^2$ is an alkylene, arylene, substituted alkylene, or substituted arylene group;
(CO) represents a carbonyl group C=O;
n is an integer of 1 or greater.

A wide variety of polyisocyanates are suitable to prepare the isocyanate-functional prepolymer. Typically the polyisocyanates comprise a diisocyanate, although if desired, higher functional polyisocyanates (such as triisocyanates, or tetraisocyanates) can be used. Examples of suitable diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl)biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl- 1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

Examples of useful polyols include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom.

When copolymers are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One example of a copolymer containing oxyalkylene repeating units is a polyoxyalkylene-capped polyoxyalkylene polyol (e.g., a polyoxyethylene-capped polyoxypropylene).

When higher molecular weight polyols (i.e., polyols having weight average molecular weights of at least about 2,000) are used, it is often desirable that the polyol component be "highly pure" (i.e., the polyol approaches its theoretical functionality—e.g., 2.0 for diols, 3.0 for triols, etc.). These highly pure polyols generally have a ratio of polyol molecular weight to weight % monol of at least about 800, typically at least about 1,000, and more typically at least about 1,500. For example, a 12,000 molecular weight polyol with 8 weight % monol has such a ratio of 1,500 (i.e., 12,000/8=1,500). Generally it is desirable that the highly pure polyol contains about 8% by weight monol or less.

Generally, as the molecular weight of the polyol increases in this embodiment, a higher proportion of monol may be present in the polyol. For example, polyols having molecular weights of about 3,000 or less desirably contain less than about 1% by weight of monols. Polyols having molecular weights of greater than about 3,000 to about 4,000 desirably contain less than about 3% by weight of monols. Polyols having molecular weights of greater than about 4,000 to about 8,000 desirably contain less than about 6% by weight of monols. Polyols having molecular weights of greater than about 8,000 to about 12,000 desirably contain less than about 8% by weight of monols.

Examples of highly pure polyols include those available from Lyondell Chemical Company of Houston, Tex., under the trade designation, ACCLAIM, and certain of those under the trade designation, ARCOL.

Typically, the prepolymer is prepared and applied to the first binder layer, either as a 100% solids mixture or as a solution. Upon exposure to atmospheric moisture, a portion of the prepolymer reacts with the atmospheric moisture to form amino groups as shown in Reaction Scheme 2 (note that reaction scheme 2 shows the formation of a diamine, but it is also possible that only one isocyanate group reacts with water to form an amino group):

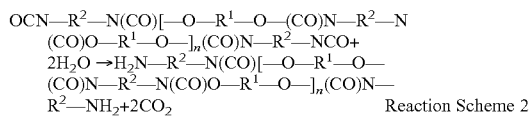

Reaction Scheme 2

The amino groups formed by the reaction of Reaction Scheme 2 react with the isocyanate groups of the remaining portion of prepolymer to form the urethane-based polymer. The reaction of amines with isocyanates generate urea linkages, so that the formed urethane-based polymer contains both urethane and urea linkages. The reaction of isocyanate with water is slower than the reaction of amine with isocyanate, so the time necessary to achieve complete curing of second binder layer may be relatively long. In some embodiments, complete curing may be achieved in 7 days. In other embodiments, curing may be essentially complete in 3 days. While not wishing to be bound by theory, it is believed that slow moisture curing of the second binder layer helps to anchor this layer to the first binder layer (as will be discussed below) and to the substrate. Because the curing does not require the input of energy, but merely the exposure of the layer to atmospheric moisture, relatively long curing times are not impractical.

The relatively long curing times for the second binder layer can be advantageous in generating strong adhesion between the first binder layer and the second binder layer. As mentioned above, the crosslinked copolymer of the first binder layer includes acid and/or hydroxyl functional groups. Since the prepolymer contains isocyanate groups, these isocyanate groups can react with the acid and/or hydroxyl groups in the crosslinked copolymer of the first binder layer to form chemical bonds, and thereby linking the first and second binder layers. While not wishing to be bound by theory, it is believed that this co-reaction contributes to the strong adhesion between the first binder layer and the second binder layer. Thus because the moisture curing reaction is relatively slow, relatively high concentrations of unreacted isocyanate groups on the prepolymer are available for this bonding for relatively long periods of time. Additionally, because the prepolymer is of relatively low molecular weight and thus relatively high mobility, it is also more likely for an unreacted isocyanate group to encounter an acid or hydroxyl group on the crosslinked copolymer and react.

The multi-layer retroreflective articles comprise substrate layer 40 attached to the second binder layer 30. A wide variety of materials are suitable for use as the substrate layer. Examples of particularly suitable substrate layers include fabrics and films.

Examples of suitable fabrics include the wide variety of natural or synthetic cloth materials, woven and non-woven web materials, knit materials, croqueted materials, and the like. If the multi-layer retroreflective article is to be used as an appliqué that is to be attached to a fabric article, it may be desirable to select a fabric that is compatible in composition and matching in texture and color to the fabric article to which it is to be attached.

The substrate may also be a film. A wide variety of films are suitable. Examples of suitable films include olefinic films (such as polyethylene, polypropylene, and copolymers containing ethylene or propylene), polyurethane films, cellulose films, polyacrylate films, polyester films (such as PET, polyethylene terepthalate), and the like.

Also disclosed herein are clothing articles that can be prepared using the retroreflective appliqués described above. The articles of clothing comprise a substrate surface which forms part of the outer portion of an article of clothing and a retroreflective appliquésecured to the substrate surface. The retroreflective appliqué is secured to the substrate surface by the substrate layer of the appliqué.

The appliqué can be secured to the substrate surface of the article of clothing either through the use of an adhesive or by a mechanical means, such as sewing. Examples of suitable adhesives include curing adhesives and heat activated adhesives.

Examples of suitable articles of clothing that can be prepared using the retroreflective appliqués described above include shirts, sweaters, jackets, coats, pants, shoes, socks, gloves, belts, hats, suits, one-piece body garments, vests, bags, and backpacks.

Also disclosed are methods of preparing and using retroreflective articles such as retroreflective appliqués. These methods include preparing retroreflective appliqués, and attaching the retroreflective appliqué to the surface of an article of clothing. The materials used to prepare each of the layers have been described in detail above.

The method of preparing a retroreflective appliqué comprises preparing the retroreflective layer, forming a first binder layer on the retroreflective layer, forming a second binder layer on the first binder layer, and laminating a substrate layer to the second binder layer.

The retroreflective layer is prepared by forming a monolayer of partially embedded optical elements in a carrier web. The monolayer of optical elements is assembled by cascading transparent microspheres onto a carrier web which secures the microspheres in a desired temporary assignment. Typically, the carrier web is a heat softened polymeric lining on a paper sheet. Some examples of useful polymers for the polymeric lining include polyvinyl chloride, polysulfones, polyalkylenes such as polyethylene, polypropylene and polybutylene, polyesters, and the like. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the polymer lining retains the microspheres in a desired arrangement. A reflective material such as a specularly reflective metal or dielectric mirror then is applied to the carrier web and the microspheres so that the protruding portions of the microspheres, as well as the exposed portions of polymer, become coated with a reflective material layer. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

After the retroreflective elements have been formed on the carrier web, the first binder layer is formed over the retroreflective elements. This may be accomplished by applying the crosslinkable (meth)acrylate-based pressure sensitive adhesive to the retroreflective elements layer. The crosslinkable (meth)acrylate-based pressure sensitive adhesive may be applied by any suitable coating technique. The crosslinkable (meth)acrylate-based pressure sensitive adhesive may be applied as a 100% solids material or as a solvent-borne solutions, typically as a solvent-borne solution. Additionally, it may be possible to form the crosslinkable (meth)acrylate-based pressure sensitive adhesive on a carrier sheet such as release liner and laminating the formed layer to the retroreflective elements layer. In general, two different but closely related methods of preparing the crosslinkable (meth)acrylate-based pressure sensitive adhesive have been found to be suitable. Is some embodiments, the components are mixed, coated and cured. In other embodiments, the pressure sensitive adhesive and the crosslinking agent are mixed and permitted to stand for 24 hours prior to mixing with the other components and coating. The (meth)acrylate-based pressure sensitive adhesive layer is then exposed to an elevated temperature of from 120° C. to 150° C. to form a non-thermoplastic crosslinked (meth)acrylate-based copolymer. The heat may be supplied by any convenient source such as an oven.

To the formed non-thermoplastic crosslinked (meth)acrylate-based copolymer layer is formed the second binder layer. The second binder layer comprises a moisture-cured urethane-based polymer. This polymer is formed by applying the urethane-based prepolymers described above to the crosslinked (meth)acrylate-based copolymer layer, and exposing the prepolymer layer to an elevated temperature of from 60° C. to 90° C., and laminating a substrate layer to the urethane-based moisture-curable layer. The lamination of the substrate layer to the urethane-based moisture-curable layer can be done at a temperature from room temperature to 130° C. The heat for these steps may be supplied by passing the layers through an oven or through a heated nip roll, which supplies not only heat, but also pressure to assist the bonding of the layers. After lamination, the urethane-based moisture-curable layer is permitted to cure by exposure to atmospheric moisture. The carrier web can then be removed to expose the retroreflective elements and generate the retroreflective article or appliqué.

The method may further include attaching of the substrate layer of the formed retroreflective appliqué to a substrate surface of an article of clothing. Methods for attaching the retroreflective appliqué to a substrate surface of an article of clothing have been described above.

As mentioned above, articles of clothing prepared as described in this disclosure have improved launderability. Launderability can be measured by measuring the coefficient of retroreflection $R_A$ before (initial value) and after (final value) a series of washing cycles. Details on measuring $R_A$ and testing protocol used for washing retroreflective articles are presented in the Examples section below. Typically the retroreflective appliqué retains at least 40% of the initial retroreflectivity after 25 wash cycles. In some embodiments, the appliqué retains 70-85% of the initial retroreflectivity after 25 wash cycles.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sinopharm Chemical Reagent, Co. unless otherwise noted.

| Table of Abbreviations | |
|---|---|
| Abbreviation or Trade Designation | Description |
| PSA | (Meth)acrylate-based pressure sensitive adhesive commercially available as "CSA 3050" from 3M Company. |
| Epoxy resin | Epoxy resin "E51" commercially available from Baling Petrochemical Corporation. |
| Catalyst | A 30% solution of 2-methylimidazole in ethanol. |
| SCA | Silane Coupling Agent, 3-glycidoxypropyltrimethoxysilane, commercially available as "KH560" from Nanjing Alchemist Chemical Co. |

-continued

Table of Abbreviations

| Abbreviation or Trade Designation | Description |
|---|---|
| MCPUP | Moisture Curing PolyUrethane-based Polymer, prepared by the reaction of Isocyanate and Polyol at a ratio of Isocyanate:Polyol of 3:1. |
| Isocyanate | Diisocyanate "DESMODUR L 75" commercially available from Bayer. |
| Polyol | Polyester polyol "DYNACOLL 7000" commercially available from Evonik Degussa Co. |
| Fabric | A polyester textile, TC fabric, with a cotton to polyester ratio of 12:88 commercially available from Chaofan. |

Test Methods
Retroreflective Brightness Test (RA)

Retroreflective brightness was determined in accordance with the procedure defined in CIE Publication No. 54.2. Measurements were made on square samples of 10 cm×10 cm at divergence angles of about 0.2° and entrance angles of about −45°. The retroreflective brightness of the middle of each sample was determined periodically.

Home Wash Durability Test

Launderability of articles was evaluated by washing a piece of fabric to which the subject article had been applied for the indicated number of cycles in a standard Washing Machine Model FOM71-CLS from Electrolux using ISO 6330:2000 method 2A for heavily soiled, colored fabric. Each cycle was about 1 hour in length. After every fifth wash/rinse cycle, each sample was tumble dried in a Whirlpool dryer Model AWZ9995 until the total load was dry. Each sample was then tested for retroreflective performance.

EXAMPLES

Preparation of Retro-Reflective Layer

For each example prepared below, a retro-reflective layer was prepared and coated with a first bead bond layer. Glass microspheres having an average diameter of 40 to 90 micrometers were partially embedded into a carrier web of polyethylene coated paper and aluminum specular reflective layers were applied to the exposed portions of the microspheres to yield retroreflective elements.

Preparation of Binder Layer 1 Formulations:

Pressure sensitive adhesive binder layers were prepared using the reagents listed in Table 1. For the Formulation compositions, the listed reagents were mixed and coated, for the Formulation plus 24 hour compositions, the Epoxy Resin and Maleic anhydride were mixed and allowed to sit for 24 hours prior to mixing with the remaining reagents.

TABLE 1

| | Binder Layer 1 Formulations | | | | | |
|---|---|---|---|---|---|---|
| Formulation | PSA (wt %) | Epoxy Resin (wt %) | Maleic Anhydride (wt %) | Catalyst (wt %) | SCA (wt %) | Ethyl Acetate (wt %) |
| 0 | 49 | 11 | 0 | 4.5 | 1 | 34 |
| 0 plus 24 hours | 49 | 11 | 0 | 4.5 | 1 | 34 |
| 1 | 47 | 11 | 1.5 | 4.6 | 1 | 35 |
| 1 plus 24 hours | 47 | 11 | 1.5 | 4.6 | 1 | 35 |
| 2 | 47 | 11 | 1.3 | 4.6 | 1 | 35 |
| 2 plus 24 hours | 47 | 11 | 1.3 | 4.6 | 1 | 35 |
| 3 | 48 | 11 | 1.1 | 4.6 | 1 | 35 |
| 3 plus 24 hours | 48 | 11 | 1.1 | 4.6 | 1 | 35 |
| 4 | 48 | 11 | 0.92 | 4.6 | 1 | 35 |
| 4 plus 24 hours | 48 | 11 | 0.92 | 4.6 | 1 | 35 |

Comparative Examples C1 and C2

Formulation 0 and Formulation 0 after 24 hours

Figure 2:
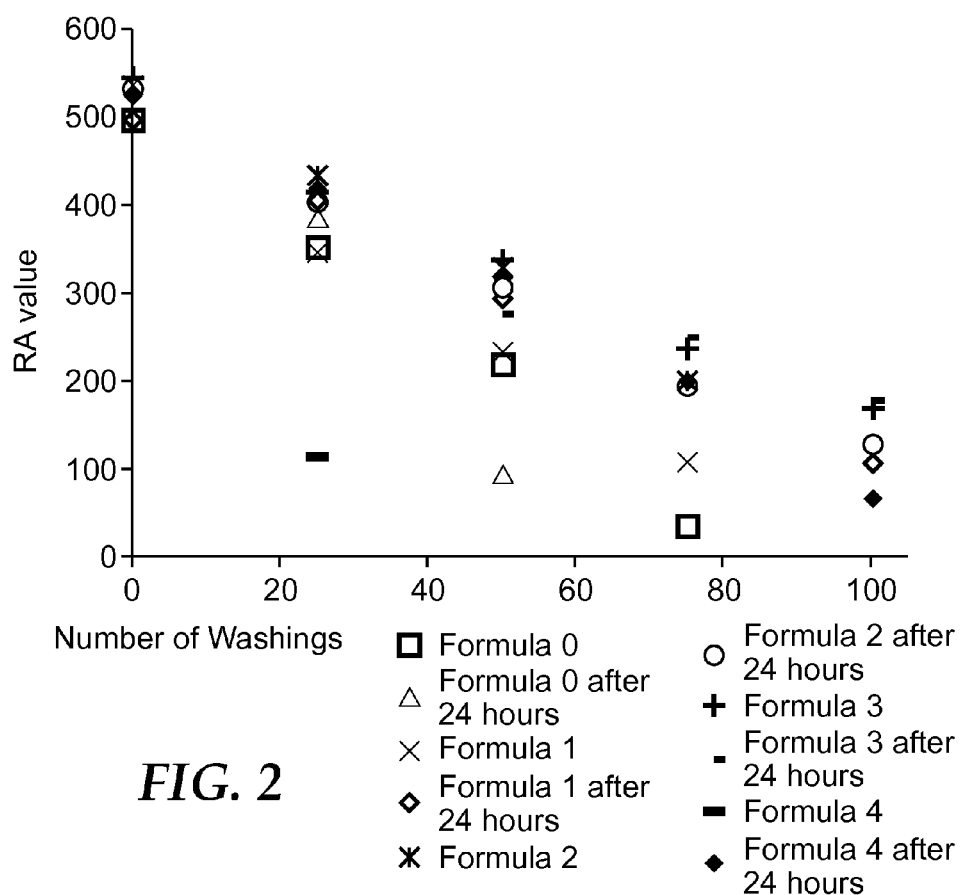
FIG. 2 shows a graphical representation of experimental data for the wash performance of retroreflective articles of this disclosure.

Formulation 0: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Formulation 0 after 24 Hours:

To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Example 1

Formulation 1 and Formulation 1 after 24 Hours

Formulation 1: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Formulation 1 after 24 Hours: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Example 2

Formulation 2 and Formulation 2 after 24 Hours

Formulation 2: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Formulation 2 after 24 Hours: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table w and the graph in FIG. 2.

Example 3

Formulation 3 and Formulation 3 after 24 Hours

Formulation 3: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Formulation 3 after 24 Hours: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

Example 4

Formulation 4 and Formulation 4 after 24 Hours

Formulation 4: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness, but as the value was below 100, no further testing or measurements were made.

Formulation 4 after 24 Hours: To the aluminum layer of retro-reflective layer described above, was coated a pressure sensitive adhesive mixture listed in Table 1 above at a thickness of 100 micrometers. The coated retro-reflective article was passed through an 85° C. oven for 40 seconds. The MCPUP was coated on the PSA layer at a thickness of 50 micrometers, and the resulting retro-reflective layer was passed through a 65° C. oven for 60 seconds. Fabric was laminated on the MCPUP layer, and the resulting article was permitted to sit for one week exposed to atmospheric moisture. The resulting article was tested for Retroreflective Brightness and the Home Washability using the test methods given above. The results are shown in Table 2 and the graph in FIG. 2.

TABLE 2

| Formulation Number | RA Initial (0 Wash Cycles) | RA after 25 Wash Cycles) | RA after 50 Wash Cycles) | RA after 75 Wash Cycles) | RA after 100 Wash Cycles) |
|---|---|---|---|---|---|
| 0 | 501 | 352 | 221 | 36 | NM |
| 0 after 24 hours | 509 | 389 | 96 | NM | NM |
| 1 | 515 | 348 | 233 | 108 | NM |
| 1 after 24 hours | 528 | 419 | 296 | 201 | 107 |
| 2 | 535 | 436 | 329 | 200 | 117 |
| 2 after 24 hours | 532 | 407 | 310 | 195 | 130 |

TABLE 2-continued

| Formulation Number | RA Initial (0 Wash Cycles) | RA after 25 Wash Cycles) | RA after 50 Wash Cycles) | RA after 75 Wash Cycles) | RA after 100 Wash Cycles) |
|---|---|---|---|---|---|
| 3 | 548 | 419 | 339 | 235 | 169 |
| 3 after 24 hours | 546 | 402 | 349 | 247 | 179 |
| 4 after 24 hours | 502 | 410 | 320 | 203 | 68 |

NM = Not Measured

What is claimed is:

1. A retroreflective article comprising:
    a first binder layer with a first major surface and a second major surface and comprising a non-thermoplastic crosslinked (meth)acrylate-based copolymer;
    a retroreflective layer comprising a plurality of retroreflective elements at least partially embedded in the first major surface of the first binder layer;
    a second binder layer adhered to the second major surface of the first binder layer and comprising a moisture-cured urethane-based polymer; and
    a substrate layer attached to the second binder layer, wherein the first binder layer and the second binder layer comprise functional groups capable of co-reacting to form a chemical bond.

2. The retroreflective article of claim 1, wherein the non-thermoplastic crosslinked (meth)acrylate-based copolymer comprises a crosslinked (meth)acrylate-based pressure sensitive adhesive.

3. The retroreflective article of claim 2, wherein the (meth)acrylate-based pressure sensitive adhesive comprises a copolymer prepared from at least one alkyl (meth)acrylate monomer and at least one acidic (meth)acrylate monomer.

4. The retroreflective article of claim 1, wherein the non-thermoplastic crosslinked (meth)acrylate-based copolymer comprises a cured mixture comprising a (meth)acrylate-based pressure sensitive adhesive and a maleic anhydride modified epoxy resin.

5. The retroreflective article of claim 1, wherein the retroreflective elements comprise:
    optical elements that comprise light transmissive microspheres; and
    a reflective layer disposed between the optical elements and the first surface of the first binder layer.

6. The retroreflective article of claim 1, wherein the moisture-cured urethane-based polymer is the reaction product of a mixture comprising:
    a pre-polymer comprising:
        at least one polyisocyanate, wherein the polyisocyanate comprises an aliphatic, cycloaliphatic, aromatic, or heterocyclic polyisocyanate; and
        at least one polyol, wherein the polyol comprises a polyester-containing or polyether-containing polyol, and wherein the ratio of polyisocyanate to polyol is greater than 1:1 and less than 8:1; and
    atmospheric moisture.

7. The retroreflective article of claim 1, wherein the substrate layer comprises a fabric or a film.

8. The retroreflective article of claim 1, wherein the functional groups capable of co-reacting to form a chemical bond comprise acidic, or hydroxyl groups in the first binder layer and isocyanate groups in the second binder layer.

9. An article of clothing comprising:
    a substrate surface which forms part of the outer portion of an article of clothing; and
    a retroreflective appliqué comprising:
        a first binder layer with a first major surface and a second major surface and comprising a non-thermoplastic crosslinked (meth)acrylate-based copolymer;
        a retroreflective layer comprising a plurality of retroreflective elements at least partially embedded in the first major surface of the first binder layer; and
        a second binder layer adhered to the second major surface of the first binder layer and comprising a moisture-cured urethane-based polymer; and
        a substrate layer attached to the second binder layer, wherein the substrate layer of the retroreflective appliqué is secured to the substrate surface.

10. The article of clothing of claim 9, wherein the wherein the non-thermoplastic crosslinked (meth)acrylate-based copolymer comprises a crosslinked (meth)acrylate-based pressure sensitive adhesive.

11. The article of clothing of claim 10, wherein the (meth)acrylate-based pressure sensitive adhesive comprises a copolymer prepared from at least one alkyl (meth)acrylate monomer and at least one acidic (meth)acrylate monomer.

12. The article of clothing of claim 9, wherein the non-thermoplastic crosslinked (meth)acrylate-based copolymer comprises a cured mixture comprising a (meth)acrylate-based pressure sensitive adhesive and a maleic anhydride modified epoxy resin.

13. The article of clothing of claim 9, wherein the moisture-cured urethane-based polymer is the reaction product of a mixture comprising:
    a pre-polymer comprising:
        at least one polyisocyanate, wherein the polyisocyanate comprises an aliphatic, cycloaliphatic, aromatic, or heterocyclic polyisocyanate; and
        at least one polyol, wherein the polyol comprises a polyester-containing or polyether-containing polyol, and wherein the ratio of polyisocyanate to polyol is greater than 1:1 and less than 8:1; and
    atmospheric moisture.

14. The article of clothing of claim 9, wherein the substrate layer of the retroreflective appliqué comprises a fabric or a film.

15. The article of clothing of claim 9, selected from the group consisting of a shirt, sweater, jacket, coat, pants, shoe, sock, glove, belt, hat, suit, one-piece body garment, vest, bag, and backpack.

* * * * *